(12) United States Patent
Watanabe

(10) Patent No.: US 10,970,088 B2
(45) Date of Patent: Apr. 6, 2021

(54) USER INTERFACE HELP CONTROL DEVICE, AND INFORMATION STORAGE MEDIUM

(71) Applicant: JEOL Ltd., Tokyo (JP)

(72) Inventor: Yasuyuki Watanabe, Tokyo (JP)

(73) Assignee: JEOL Ltd., Tokyo (JP)

( * ) Notice: Subject to any disclaimer, the term of this patent is extended or adjusted under 35 U.S.C. 154(b) by 0 days.

(21) Appl. No.: 15/830,419

(22) Filed: Dec. 4, 2017

(65) Prior Publication Data
US 2018/0157500 A1    Jun. 7, 2018

(30) Foreign Application Priority Data
Dec. 5, 2016   (JP) .............................. JP2016-235675

(51) Int. Cl.
*G06F 9/451*    (2018.01)
*G06F 3/0481*    (2013.01)
(Continued)

(52) U.S. Cl.
CPC ....... *G06F 9/451* (2018.02); *G01N 35/00871* (2013.01); *G06F 3/0481* (2013.01);
(Continued)

(58) Field of Classification Search
CPC ...... G06F 9/451; G06F 3/0481; G06F 3/0482; G06F 2203/04804; G06F 9/453; G01N 35/00871; G01N 2035/0091
See application file for complete search history.

(56) References Cited

U.S. PATENT DOCUMENTS 6,690,390 B1 * 2/2004 Walters ............... G06F 3/04895
715/705
9,454,251 B1 * 9/2016 Guihot ................... G08C 17/02
(Continued)

FOREIGN PATENT DOCUMENTS

| JP | 201264051 A | 3/2012 |
| JP | 2014115104 A | 6/2014 |
| JP | 201549249 A | 3/2015 |

OTHER PUBLICATIONS

Extended European Search Report issued in EP17205025 dated Apr. 11, 2018.
(Continued)

*Primary Examiner* — Daniel W Parcher
(74) *Attorney, Agent, or Firm* — The Webb Law Firm

(57) ABSTRACT

A control device controls an analyzing device or a processing device by using an application performing control for causing a GUI image including a plurality of GUI components to be displayed on a display screen of a display unit. The control device includes: a GUI component designation information receiving unit that receives GUI component designation information used for designating a GUI component among the GUI components; a position information acquiring unit that identifies the GUI component designated on the basis of the GUI component designation information and acquires position information indicating a position of the identified GUI component on the display screen from an operation system; and an emphasizing image display control unit that performs control for causing an image for emphasizing the identified GUI component to be displayed on the display screen on the basis of the position information.

7 Claims, 9 Drawing Sheets

(51) Int. Cl.
  *G01N 35/00* (2006.01)
  *G06F 3/0482* (2013.01)

(52) U.S. Cl.
  CPC ..... *G06F 9/453* (2018.02); *G01N 2035/0091* (2013.01); *G06F 3/0482* (2013.01); *G06F 2203/04804* (2013.01)

(56) References Cited

U.S. PATENT DOCUMENTS

| | | | |
|---|---|---|---|
| 2003/0222898 A1* | 12/2003 | Macomber | G06F 9/453 715/709 |
| 2005/0080588 A1 | 4/2005 | Kobayashi et al. | |
| 2006/0053372 A1 | 3/2006 | Adkins et al. | |
| 2007/0225580 A1* | 9/2007 | Wang | G06F 19/00 600/323 |
| 2011/0131491 A1 | 6/2011 | Lu et al. | |
| 2011/0271185 A1* | 11/2011 | Chen | G06F 9/453 715/708 |
| 2013/0124207 A1* | 5/2013 | Sarin | G10L 15/22 704/275 |
| 2014/0047334 A1* | 2/2014 | Nouard | G06F 9/453 715/705 |
| 2014/0149432 A1* | 5/2014 | Chilana | G06F 17/30528 707/749 |
| 2014/0354624 A1* | 12/2014 | Chaji | G06F 1/3265 345/212 |
| 2015/0066382 A1 | 3/2015 | Von Allmen | |
| 2015/0261872 A1 | 9/2015 | Amano et al. | |

OTHER PUBLICATIONS

Notice of Reasons for Refusal issued in JP2016-235675 dated Mar. 24, 2020.
Examination Report issued in EP17205025.4 dated Apr. 6, 2020.

* cited by examiner

USER INTERFACE HELP CONTROL DEVICE, AND INFORMATION STORAGE MEDIUM

CROSS-REFERENCE TO RELATED APPLICATION

This application claims priority to Japanese Patent Application No. 2016-235675 filed Dec. 5, 2016, the disclosure of which is hereby incorporated in its entirety by reference.

BACKGROUND OF THE INVENTION

The present invention relates to a control device, and an information storage medium.

As means which receives a user operation in a control device for controlling an analyzing device such as an electronic microscope, a mass spectroscope, an electron probe micro-analyzer or a processing device such as a focus ion beam system, a graphical user interface (GUI) is known. For example, Japanese Patent Application Publication No. 2014-115104 discloses a GUI for a user to instruct the dilution rate of a standard specimen in a mass spectroscope, a GUI for checking whether or not a calibration curve is appropriately produced, and the like.

Since a method of operating an analyzing device or a processing device as mentioned above is complicated, an unskilled user may operate a GUI, while looking at an electronic manual. However, even when the user can know a GUI component to be operated next by referring to the electronic manual, a large number of GUI components are displayed on the displayed screen of a control device. Accordingly, the user has to find the GUI component to be operated next from among the large number of GUI components.

SUMMARY OF THE INVENTION

The present invention can provide a control device which can improve the operability of a GUI, and an information storage medium.

According to a first aspect of the invention, there is provided a control device controlling an analyzing device or a processing device by using an application performing control for causing a GUI image including a plurality of GUI components to be displayed on a display screen of a display unit, the control device including:

a GUI component designation information receiving unit that receives GUI component designation information used for designating a GUI component among the GUI components;

a position information acquiring unit that identifies the GUI component designated on the basis of the GUI component designation information and acquires position information indicating a position of the identified GUI component on the display screen from an operation system; and an emphasizing image display control unit that performs control for causing an image for emphasizing the identified GUI component to be displayed on the display screen on the basis of the position information.

According to a second aspect of the invention, there is provided a non-transitory computer-readable information storage medium storing a program for performing operation assist for an application performing control for causing a GUI image including a plurality of GUI components to be displayed on a display screen of a display unit, the program causing a computer to function as:

a GUI component designation information receiving unit that receives GUI component designation information used for designating a GUI component among the GUI components;

a position information acquiring unit that identifies the GUI component designated on the basis of the GUI component designation information and acquires position information indicating a position of the identified GUI component on the display screen from an operation system; and an emphasizing image display control unit that performs control for causing an image for emphasizing the identified GUI component to be displayed on the display screen on the basis of the position information.

Figure 1:
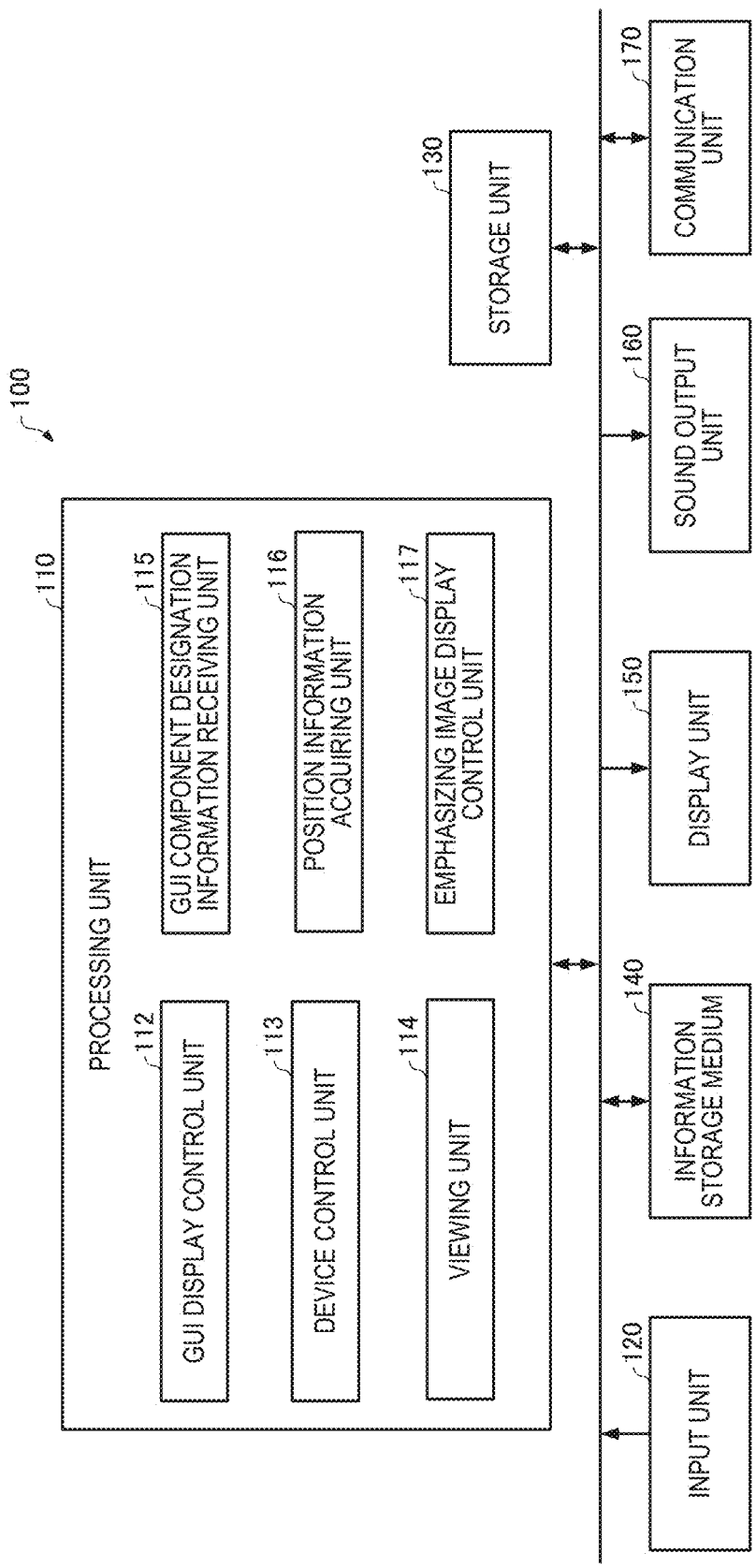
FIG. 1 is a functional block diagram of a control device according to an embodiment of the invention.

DETAILED DESCRIPTION OF THE EMBODIMENT (1) A control device according to an embodiment of the invention is a control device controlling an analyzing device or a processing device by using an application performing control for causing a GUI image including a plurality of GUI components to be displayed on a display screen of a display unit, the control device including:

a GUI component designation information receiving unit that receives GUI component designation information used for designating a GUI component among the GUI components;

a position information acquiring unit that identifies the GUI component designated on the basis of the GUI component designation information and acquires position information indicating a position of the identified GUI component on the display screen from an operation system; and an emphasizing image display control unit that performs control for causing an image for emphasizing the identified GUI component to be displayed on the display screen on the basis of the position information.

The control device allows the image for emphasizing the identified GUI component to be displayed on the display screen. Consequently, a user can easily find an intended GUI component from among the plurality of GUI components. Therefore, the control device can improve the operability of a GUI.

In the control device, the position information indicating the position of the GUI component on the display screen is acquired from the operation system. This allows the image for emphasizing the identified GUI component to be displayed on the display screen without making a change such as the addition of a function to the application mentioned above.

(2) In the above control device, the emphasizing image display control unit may also perform control for causing the image for emphasizing the identified GUI component to be displayed in a superimposed manner on the GUI image which is caused to be displayed on the display screen by the application.

(3) In the above control device, the application may be an application for controlling the analyzing device or the processing device, and the GUI component designation information receiving unit may also receive the GUI component designation information output from a browser for viewing an electronic manual for the analyzing device or an electronic manual for the processing device.

(4) In the above control device, the application may also operate on the operation system.

(5) An information storage medium according to the embodiment of the invention is a non-transitory computer-readable information storage medium storing a program for performing operation assist for an application performing control for causing a GUI image including a plurality of GUI components to be displayed on a display screen of a display unit, the program causing a computer to function as:

a GUI component designation information receiving unit that receives GUI component designation information used for designating a GUI component among the GUI components;

a position information acquiring unit that identifies the GUI component designated on the basis of the GUI component designation information and acquires position information indicating a position of the identified GUI component on the display screen from an operation system; and an emphasizing image display control unit that performs control for causing an image for emphasizing the identified GUI component to be displayed on the display screen on the basis of the position information.

The foregoing embodiment allows the image for emphasizing the identified GUI component to be displayed on the display screen. Consequently, a user can easily find an intended GUI component from among the plurality of GUI components. Therefore, the foregoing embodiment can improve the operability of the GUI.

In the foregoing embodiment, the position information indicating the position of the GUI component on the display screen is acquired from the operation system. This allows the image for emphasizing the identified GUI component to be displayed on the display screen without making a change such as the addition of a function to the application mentioned above.

The following will describe in detail preferred embodiments of the invention using the drawings. Note that the embodiments described below are not intended to unduly limit the content of the invention described in the claims. Also, all the components described below are not necessarily the essential components of the invention.

The following will describe a control device for controlling an analyzing device as an example of a control device according to the invention, but the control device according to the invention is not limited thereto. The control device according to the invention may also be, e.g., a control device for controlling a processing device such as a focused ion beam system or an electron-beam printing device. Alternatively, the control device according to the invention may also be a control device for controlling a device other than an analyzing device and a processing device.

1. Control Device

Referring to the drawings, a description will be given first of a configuration of a control device according to an embodiment of the invention. FIG. 1 is an example of a functional block diagram of a control device 100 according to the present embodiment. Note that the control device according to the present embodiment may also have a configuration obtained by omitting any of the components in FIG. 1.

As illustrated in FIG. 1, the control device 100 is configured to include a processing unit 110, an input unit 120, a storage unit 130, an information storage medium 140, a display unit 150, a sound output unit 160, and a communication unit 170. The control device 100 is intended to control an analyzing device. The analyzing device to be controlled is not particularly limited. Examples of the analyzing device to be controlled include an electron microscope, a mass spectroscope, an electron probe micro-analyzer, and the like.

The input unit 120 is a device for receiving (detecting) input information from a user and outputs the input information from the user to the processing unit 110. The function of the input unit 120 can be implemented by an input device such as a touch panel (touch-panel-type display), a touch pad, a mouse, direction keys or buttons, or a keyboard.

The storage unit 130 serves as a work region for the processing unit 110, the communication unit 170, and the like. The function of the storage unit 130 can be implemented by a RAM (VRAM) or the like.

The information storage medium 140 (computer readable medium (non-transitory information storage medium)) stores a program, data, and the like. The function of the information storage medium 140 can be implemented by an optical disc (CD or DVD), a magneto-optical disc (MO), a magnetic disc, a hard disc, a magnetic tape, a memory (ROM), or the like. The processing unit 110 performs various processes in the present embodiment on the basis of the program (data) stored in the information storage medium 140. That is, the information storage medium 140 stores a program for causing a computer to function as the individual portions of the processing unit 110 (program for causing the computer to execute processes in the individual portions).

In the present embodiment, the information storage medium 140 stores a program for an operation system (OS, e.g., a program for the Windows (registered trademark)), a program for application software (hereinafter referred to also as "control application") for controlling the analyzing device, a program for application software (hereinafter referred to also as "browser") for viewing an electronic manual, and a program for application software (hereinafter referred to also as "operation assist application") for causing an image for emphasizing a GUI component to be displayed in order to assist an operation.

In the present embodiment, the information storage medium 140 also stores electronic manual information for the analyzing device.

The display unit 150 outputs the image (e.g., a GUI image or the image for emphasizing a GUI component) generated in the processing unit 110. The function of the display unit 150 can be implemented by a display such as an LCD, a CRT, or a touch panel.

The sound output unit 160 outputs the sound generated in the processing unit 110. The function of the sound output unit 160 can be implemented by a speaker, headphones, or the like.

The communication unit 170 performs various control for performing communication with a server. The function of the communication unit 170 can be implemented by hardware such as various processors or a communication ASIC, a program, or the like.

The processing unit 110 (processor) performs processes such as a process of generating a GUI image on the basis of input information from the input unit 120, a program, data received via the communication unit 170, or the like, a process for controlling the analyzing device, and a process of generating the image for emphasizing a GUI component. The processing unit 110 performs various processes using the storage unit 130 as the work region. The function of the processing unit 110 can be implemented by various processors (such as a CPU and a DSP) by executing programs. Note that at least one part of the function of the processing unit 110 may also be implemented by a dedicated circuit such as an ASIC (such as a gate array).

The processing unit 110 includes a GUI display control unit 112, a device control unit 113, a viewing unit 114, a GUI component designation information receiving unit 115, a position information acquiring unit 116, and an emphasizing image display control unit 117.

The GUI display control unit 112 performs control for causing a GUI image for controlling the analyzing device to be displayed on a display screen of the display unit 150. The GUI image caused to be displayed by the GUI display control unit 112 includes a plurality of GUI components such as buttons and icons for controlling the individual portions of the analyzing device. As a result of an operation of selecting a GUI component performed by the user using the input unit 120, the function associated with the GUI component is executed.

The device control unit 113 performs a process of receiving the input information from the input unit 120, generating a control signal for controlling the analyzing device on the basis of the input information, and transmitting the control signal to the analyzing device. Upon receiving the control signal, the analyzing device performs a predetermined operation on the basis of the control signal.

The functions of the GUI display control unit 112 and the device control unit 113 can be implemented by the processing unit 110 by executing the program for the control application.

The viewing unit 114 performs control for causing an electronic manual to be displayed on the display screen of the display unit 150. The control for causing the electronic manual to be displayed on the display screen which is performed by the viewing unit 114 allows the user to operate a GUI, while viewing the electronic manual displayed on the display screen.

The viewing unit 114 also performs a process of outputting GUI component designation information for designating a GUI component. Specifically, the viewing unit 114 performs a process of retrieving the GUI component designation information embedded in the electronic manual (document) and outputting the GUI component designation information to the GUI component designation information receiving unit 115. The GUI component designation information is information for identifying one GUI component (or a plurality of GUI components) designated from among the plurality of GUI components included in the GUI image.

The function of the viewing unit 114 can be implemented by the processing unit 110 by executing a browser program.

The GUI component designation information receiving unit 115 receives the GUI component designation information from the viewing unit 114.

The position information acquiring unit 116 performs a process of identifying the GUI component designated on the basis of the GUI component designation information and acquiring position information indicating the position of the identified GUI component on the display screen from the OS.

The emphasizing image display control unit 117 performs control for causing the image for emphasizing the identified GUI component to be displayed on the display screen on the basis of the position information of the GUI component acquired from the OS.

The functions of the GUI component designation information receiving unit 115, the position information acquiring unit 116, and the emphasizing image display control unit 117 can be implemented by the processing unit 110 by executing the program for the operation assist application.

Figure 2:
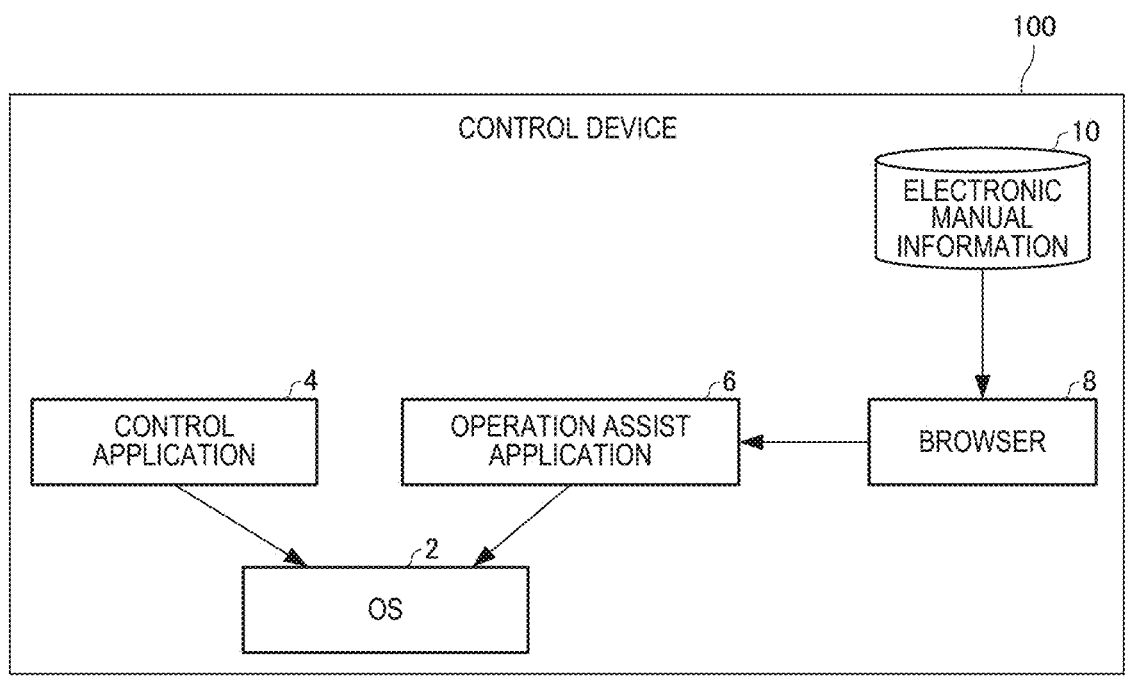
FIG. 2 is a diagram for illustrating the relations among an OS, a control application, an operation assist application, and a browser.

FIG. 2 is a diagram for illustrating the relations among an OS 2, a control application 4, an operation assist application 6, and a browser 8.

The control application 4 is software which implements the functions of the GUI display control unit 112 and the device control unit 113. The operation assist application 6 is software which implements the functions of the GUI component designation information receiving unit 115, the position information acquiring unit 116, and the emphasizing image display control unit 117. The browser 8 is software which implements the function of the viewing unit 114.

The control application 4, the operation assist application 6, and the browser 8 operate on the OS 2. The following will describe the control application 4, the operation assist application 6, and the browser 8.

(1) Control Application

The control application 4 performs control for causing a GUI image including a plurality of GUI components to be displayed on the display screen of the display unit 150. The control application 4 is an application for which the operation assist application 6 performs operation assist.

Figure 3:
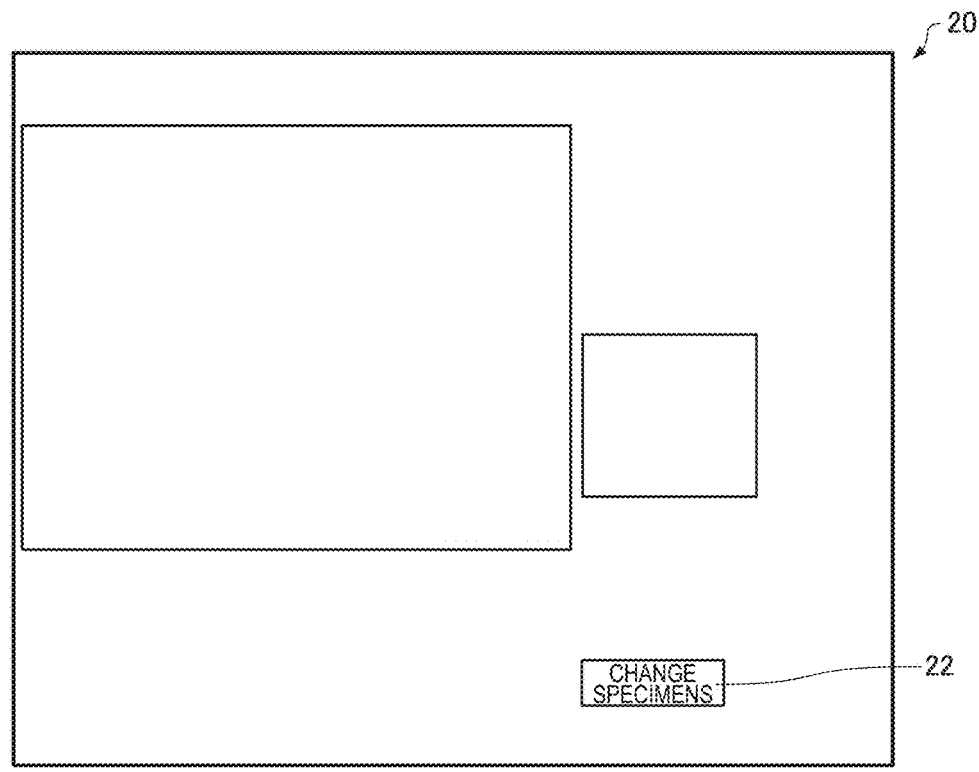
FIG. 3 is a view for illustrating an example of a GUI image which is caused to be displayed on a display screen of a display unit by the control application.

FIG. 3 is a view for illustrating an example of a GUI image 20 which is caused to be displayed on the display screen of the display unit 150 by the control application 4.

The control application 4 uses the function of the OS 2 to cause a GUI image 20 including a plurality of GUI components a button (such as a change-specimens button 22), a text box, an icon, and the like to be displayed. At this time, the OS 2 causes the storage unit 130 to store data (hereinafter referred to also as "GUI component data") showing the state of display for each of the plurality of GUI components. The GUI component data includes the name of the application to which each of the GUI components belongs, the ID of the GUI component, the name of the class of the GUI component, information about the type of the GUI component, position information (coordinate information) indicating the position of the GUI component on the display screen, information about the activity of the GUI component (information about whether or not the GUI component is selectable), information about the size of the GUI component, and the like.

(2) Browser

The browser 8 acquires electronic manual information 10 from the information storage medium 140 and causes an electronic manual (document) to be displayed on the display screen of the display unit 150. The electronic manual information 10 is given the function of outputting the GUI component designation information for designating a GUI component from the browser 8.

Figure 4:
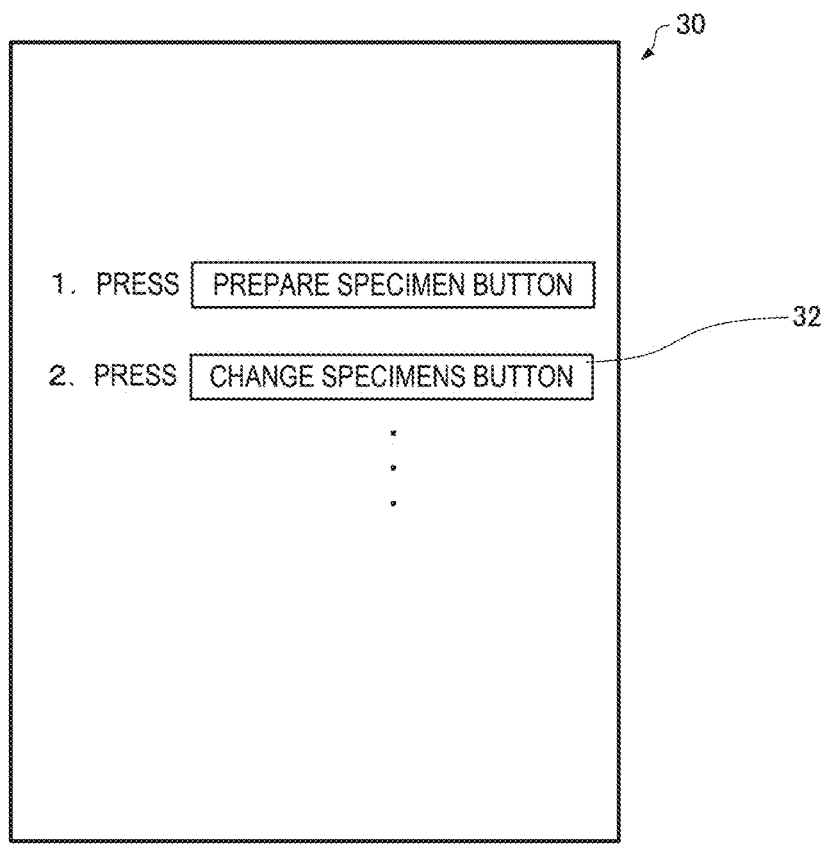
FIG. 4 is a view for illustrating an example of an electronic manual which is caused to be displayed on the display screen of the display unit by the browser.

FIG. 4 is a view for illustrating an example of an electronic manual 30 which is caused to be displayed on the display screen of the display unit 150 by the browser 8.

As illustrated in FIG. 4, when an operation of selecting a GUI component such as the movement of a cursor to a GUI component name 32 (which is the change-specimens button in the example in the drawing) displayed on the electronic manual or the clicking of the GUI component name 32 is performed, the browser 8 performs a process of outputting the GUI component designation information. The GUI component designation information includes information (application name) for identifying the application causing the GUI component to be displayed, the ID of the GUI component, the name of the class of the GUI component, and the like.

Note that the electronic manual information 10 may also have the function of outputting a request from the browser 8 to the operation assist application 6 in addition to the GUI component designation information. The request causes the operation assist application 6 to perform control for, e.g., causing the image for emphasizing the GUI component identified on the basis of the GUI component designation information to be displayed. The request may also include image information such as the color of the image, the thickness of a line, and the type of the image. In addition to outputting the GUI component designation information, the browser 8 may also output a request to the operation assist application 6.

The GUI component designation information can be acquired by causing the control application 4 for which operation assist is performed to operate on the OS 2. For example, when the OS 2 is the Windows (registered trademark), the GUI component designation information can be acquired using UI Automation. In the electronic manual, the GUI component designation information thus acquired in advance is embedded.

The browser 8 uses, e.g., a web application program interface (Web API) to output the GUI component designation information and a request to the operation assist application 6.

(3) Operation Assist Application

The operation assist application 6 assists an operation performed on the control application 4. Specifically, when an operation of designating a GUI component on the electronic manual displayed on the browser 8 is performed, the operation assist application 6 causes the image for emphasizing the corresponding GUI component in the GUI image to be displayed. This can save the task of finding the GUI component on the GUI image.

Upon receiving the GUI component designation information from the browser 8, the operation assist application 6 acquires the position information of the GUI component identified on the basis of the GUI component designation information from the OS 2. Note that the operation assist application 6 may also acquire another information (e.g., information about the size of the GUI component or a window handle) for displaying the image for emphasizing the GUI component from the OS 2.

For example, when the OS 2 is the Windows (registered trademark), it is possible to acquire GUI component data including the position information of the GUI component using UI Automation. A search for the GUI component using UI Automation can be made using, e.g., an automation ID (such as Automation ID or a resource ID), the class name, or the like.

Thus, the operation assist application 6 acquires the position information of the GUI component from the OS 2, and does not directly communicate with the control application 4 which performs control for causing the GUI component to be displayed. That is, the operation assist application 6 is software independent of the control application 4.

The operation assist application 6 performs control for causing the image for emphasizing the identified GUI component to be displayed on the display screen on the basis of the position information of the GUI component acquired from the OS 2. The operation assist application 6 uses, e.g., the function of the OS 2 to cause the image for emphasizing the GUI component to be displayed on the display screen.

Figure 5:
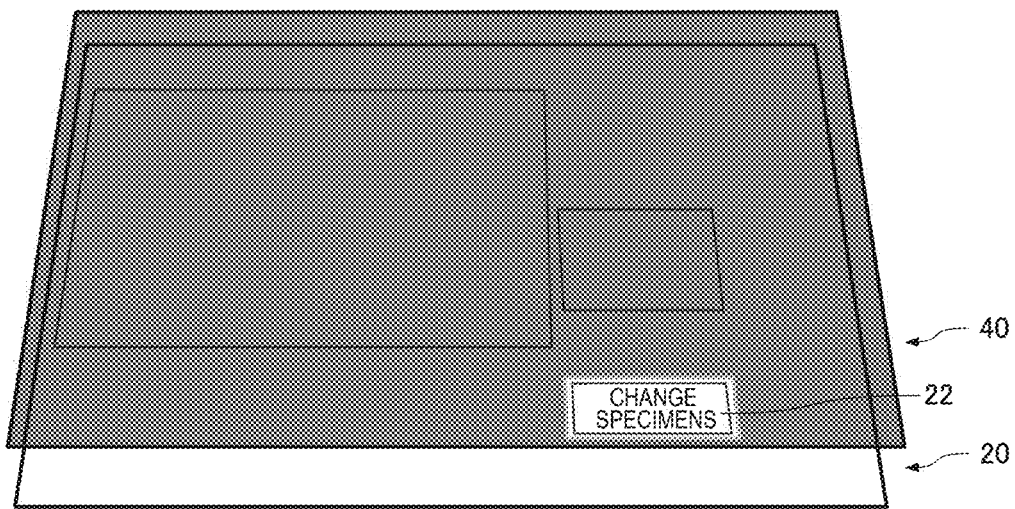
FIG. 5 is a view for illustrating an image for emphasizing a GUI component.
Figure 6:
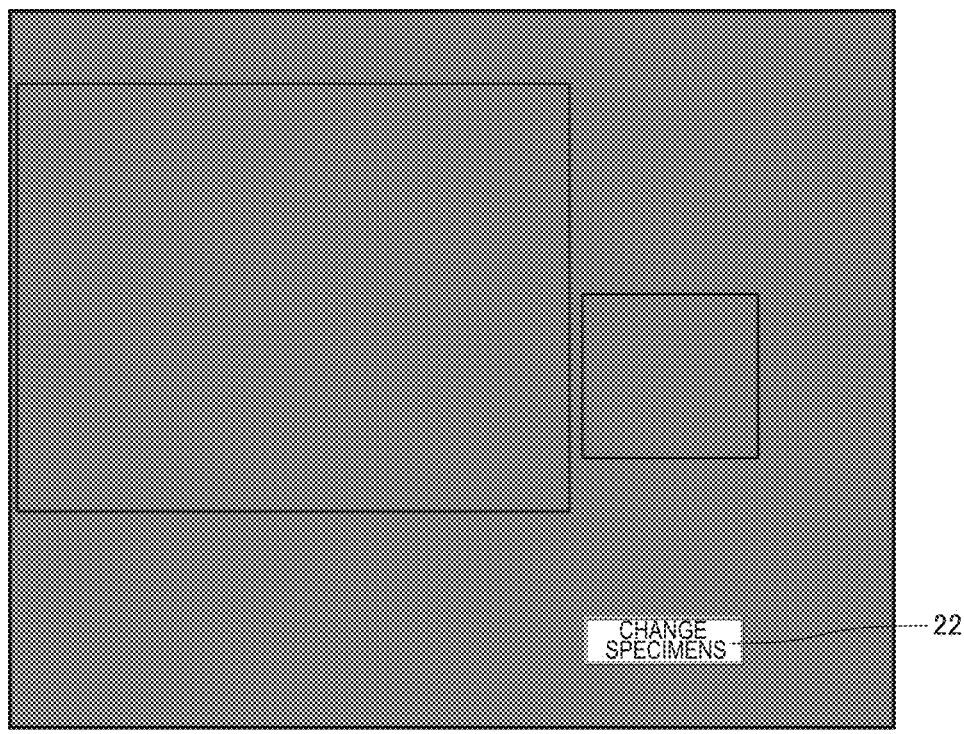
FIG. 6 is a view for illustrating the image for emphasizing the GUI component.

FIGS. 5 and 6 are views for illustrating the image for emphasizing the GUI component. As illustrated in FIG. 5, the operation assist application 6 performs control for causing a semi-transparent window 40 to be displayed in a superimposed manner on the GUI image 20 (or on the entire display screen) and highlighting only the portion thereof overlapping the designated GUI component (which is the change-specimens button 22 in the example in the drawing). As a result, as illustrated in FIG. 6, the designated GUI component is highlighted. For example, the operation assist application 6 performs the control for causing the window 40 to be displayed only for a period set in advance.

Note that, as illustrated in FIG. 5, the semi-transparent window has a degree of transparency which is about one-half of that of another window such that, even when the semi-transparent window is displayed in a superimposed manner on the other window, the other window can simultaneously be seen.

As illustrated in FIG. 6, by superimposing the window 40 in which the periphery of the designated GUI component is darkened and the portion overlapping the GUI component is lightened (brightened) on the GUI image 20, the user sees the objective GUI component naturally coming into sight without consciously looking for the objective GUI component. In addition, the window 40 is merely displayed in a superimposed manner on the GUI image 20 and, in this state, the user can perform the following operation on the control application 4.

Note that the image for emphasizing the GUI component is not limited to the example in FIG. 6. The image for emphasizing the GUI component may also be, e.g., an arrow pointing the designated GUI component or a frame surrounding the designated GUI component.

The operation assist application 6 is automatically activated with the activation of the OS 2 and closed with the closing of the OS 2. Note that, in the state where an operation of designating a GUI component is not performed, the operation assist application 6 performs control for causing a transparent window to be displayed on the entire display screen.

In the control device 100, the control of the analyzing device is performed using the GUI image 20 of the control application 4 illustrated in FIG. 3. As illustrated in FIG. 4, the user can operate the GUI, while viewing the electronic manual using the browser 8. At this time, when the user performs an operation of selecting the GUI component name displayed on the electronic manual, the operation assist application 6 causes the image (see the window 40 in FIG. 6) for emphasizing the identified GUI component to be displayed on the display screen. This allows the user to easily find the GUI component to be operated next on the GUI image 20 including the large number of GUI components.

2. Process

Next, a description will be given of a process in the processing unit 110 of the control device 100.

Figure 7:
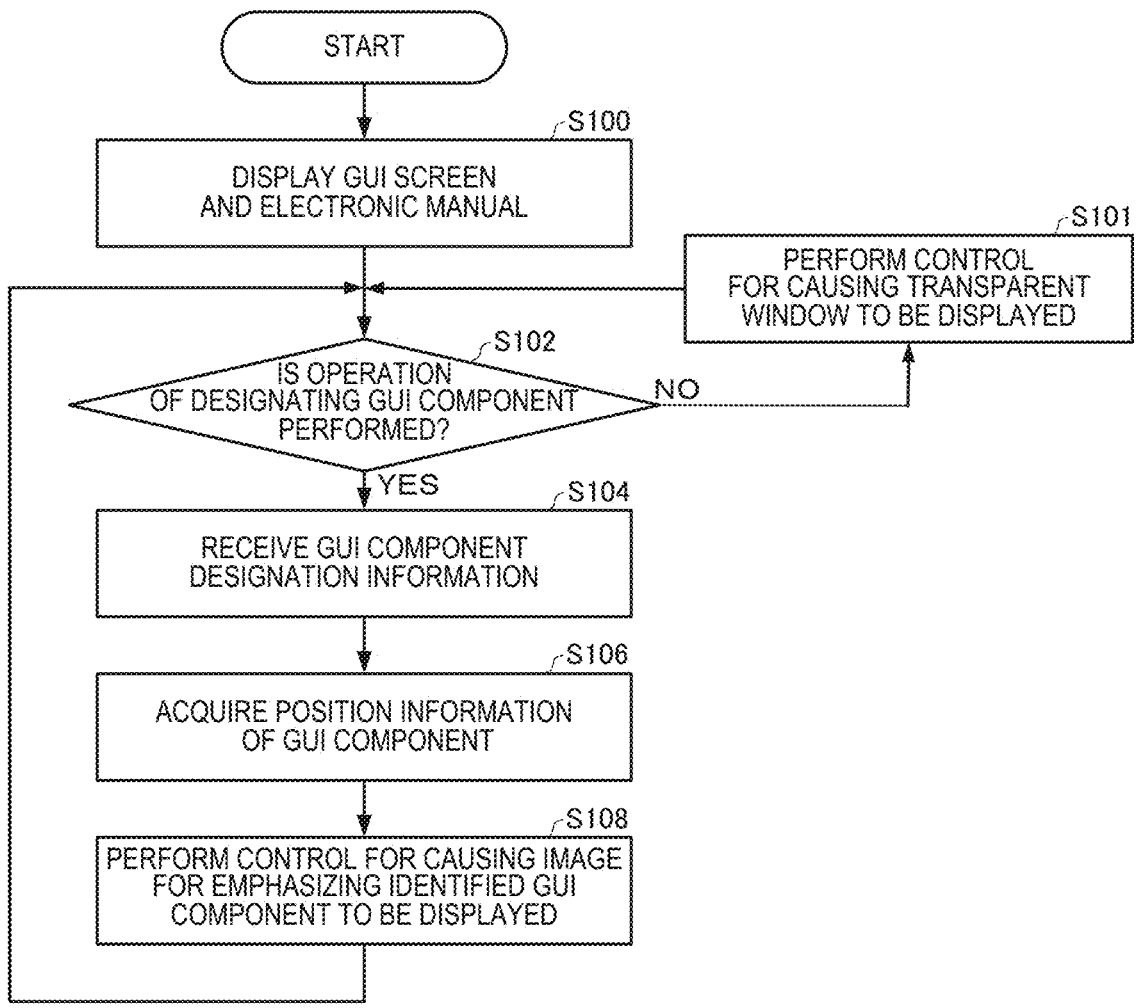
FIG. 7 is a flow chart for illustrating an example of the flow of a process in a processing unit of the control device.

FIG. 7 is a flow chart for illustrating an example of the flow of the process in the processing unit 110 of the control device 100.

First, the GUI display control unit 112 (control application 4) performs control for causing the GUI for controlling the analyzing device to be displayed on the display screen of the display unit 150, and the viewing unit 114 (browser 8) performs control for causing an electronic manual to be displayed on the display screen of the display unit 150 (Step S100).

The GUI component designation information receiving unit 115 (operation assist application 6) determines whether or not an operation of designating a GUI component is performed on the basis of the input information from the input unit 120 (Step S102). The GUI component designation information receiving unit 115 determines that the operation of designating a GUI component is performed when, e.g., the operation of designating a GUI component such as the movement of the cursor to the GUI component name displayed on the display screen of the display unit 150 is performed.

When determining that the operation of designating a GUI component is not performed (when NO is given in Step S102), the GUI component designation information receiving unit 115 performs control for causing the transparent window to be displayed on the display screen.

On the other hand, when determining that the operation of designating a GUI component is performed (when YES is given in Step S102), the GUI component designation information receiving unit 115 receives the GUI component designation information from the viewing unit 114 (browser 8) (Step S104).

Next, the position information acquiring unit 116 (operation assist application 6) identifies the GUI component designated on the basis of the GUI component designation information and acquires the position information indicating the position of the identified GUI component on the display screen from the OS 2 (Step S106).

Next, the emphasizing image display control unit 117 (operation assist application 6) performs control for causing the image for emphasizing the identified GUI component to be displayed on the display screen on the basis of the acquired position information of the GUI component (Step S108). The emphasizing image display control unit 117 ends the control of causing the image to be displayed after the lapse of a predetermined time.

The GUI component designation information receiving unit 115, the position information acquiring unit 116, and the emphasizing image display control unit 117 (operation assist application 6) return to Step S102 and repeatedly perform the process in Steps S101, S102, S104, S106, and S108.

In the present embodiment, the GUI component designation information receiving unit 115 receives the GUI component designation information for designating the GUI component. The position information acquiring unit 116 identifies the GUI component designated on the basis of the GUI component designation information and acquires the position information indicating the position of the identified GUI component on the display screen from the OS 2. The emphasizing image display control unit 117 performs the control for causing the image for emphasizing the identified GUI component to be displayed on the display screen on the basis of the position information. This allows the user to easily find the GUI component shown on the electronic manual from among the large number of GUI component on the GUI image. Accordingly, the present embodiment can improve the operability of the GUI.

Also, in the present embodiment, the position information acquiring unit 116 (operation assist application 6) acquires the position information indicating the position of the designated GUI component on the display screen from the OS 2. That is, the operation assist application 6 can perform the control (operation assist) for causing the image for emphasizing the identified GUI component to be displayed without depending on the function of the control application 4. Thus, according to the operation assist application 6, it is possible to perform operation assist without making a change such as the addition of a function to the control application 4.

In addition, since the operation assist application 6 does not depend on the function of the control application 4 and does not directly communicate with the control application 4, the operation assist application 6 can be used with various control applications.

When, e.g., an operation assisting function is added to each of the control applications, it is inevitable to make a change such as the addition of a function to each of the control applications. By contrast, the operation assist application 6 can be used with the various control applications 4 without making a change such as the addition of a function to each of the control applications 4 and therefore can easily provide the operation assisting function.

3. Modifications

Note that the invention is not limited to the embodiments described above and can variously be modified within the scope of the gist of the invention.

Figure 8:
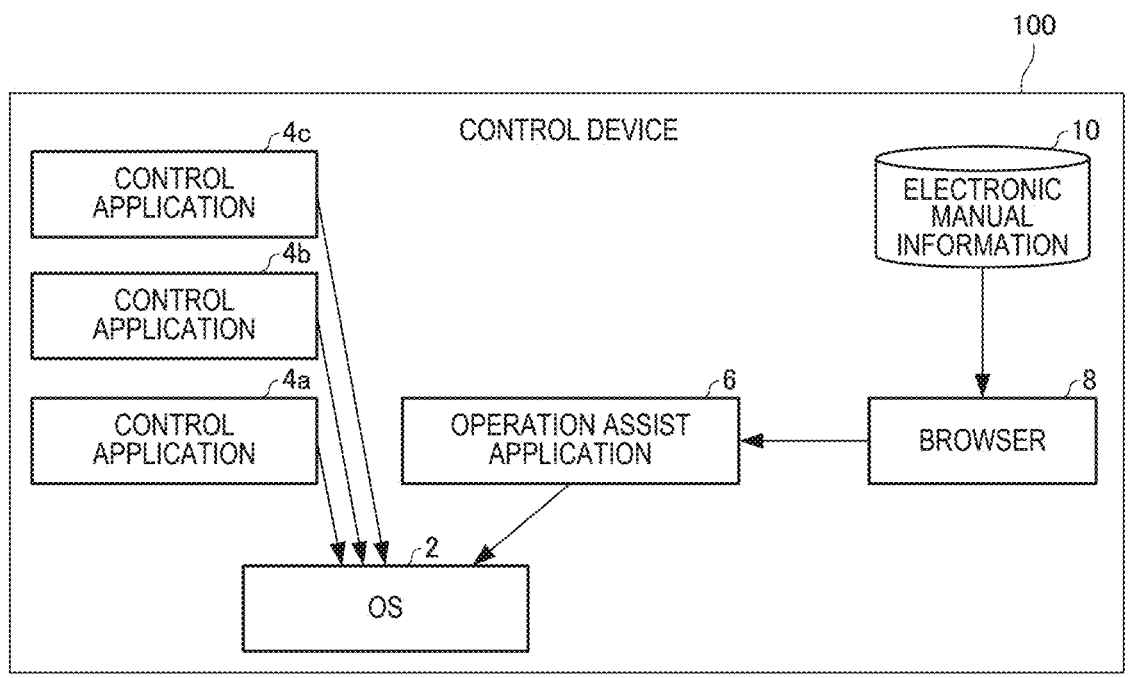
FIG. 8 is a diagram for illustrating a modification of the control device.

For example, in the embodiments described above, the description has been given of the case where the operation assist application 6 performs operation assist for the one control application 4 (highlights the designated GUI component), as illustrated in FIG. 2. However, as illustrated in FIG. 8, the operation assist application 6 can perform operation assist for a plurality of control applications. In the example in FIG. 8, the one operation assist application 6 perform operation assist for three control applications 4a, 4b, and 4c.

Figure 9:
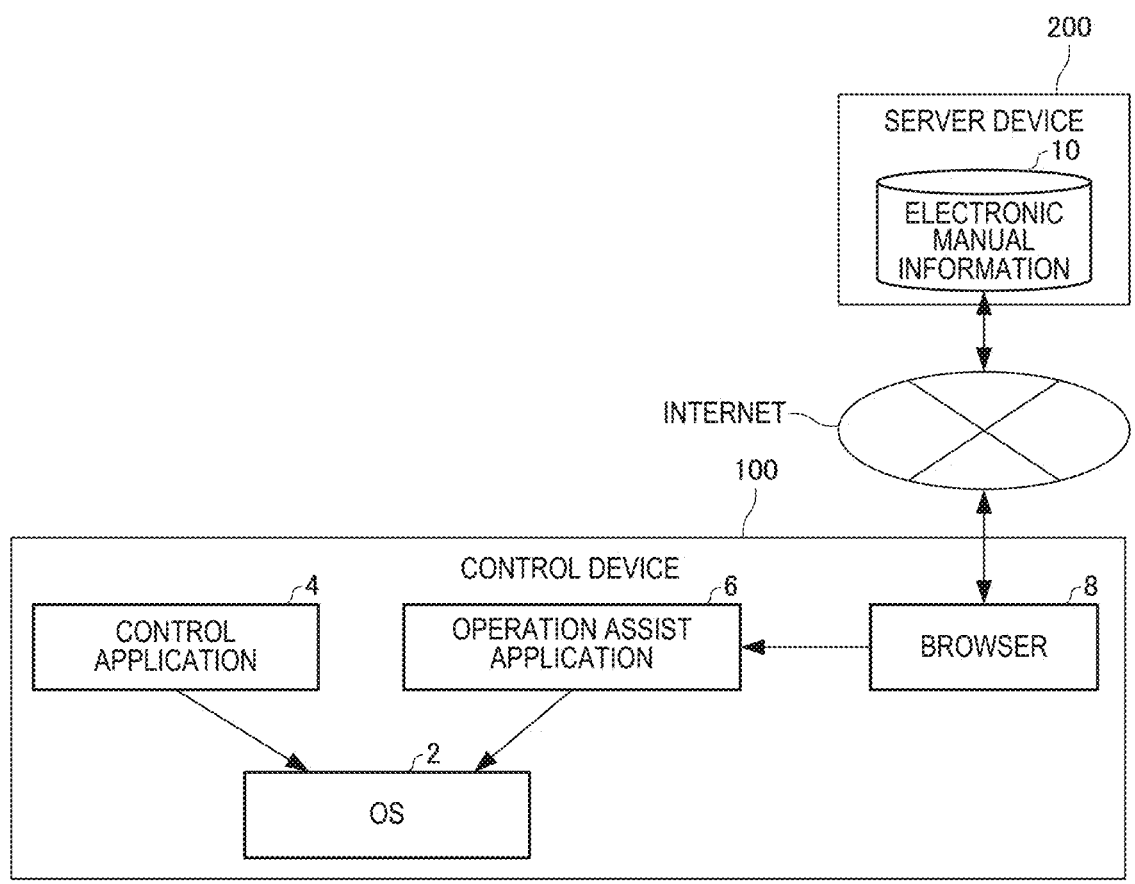
FIG. 9 is a diagram for illustrating another modification of the control device.

Also, in the embodiments described above, the description has been given of the case where, e.g., the electronic manual information 10 is stored in the information storage medium 140. However, as illustrated in FIG. 9, the electronic manual information 10 may also be provided from a server device 200 connected to the control device 100 via the Internet. This allows, e.g., the latest electronic manual to be easily provided.

The server device 200 is an information processing device capable of providing an electronic manual to the user via the control device 100 communicatively connected thereto via the Internet. Note that a cloud computing system including the server device 200 may provide the electronic manual, and the server device 200 and the control device 100 may also be communicatively connected to each other via a LAN.

Figure 10:
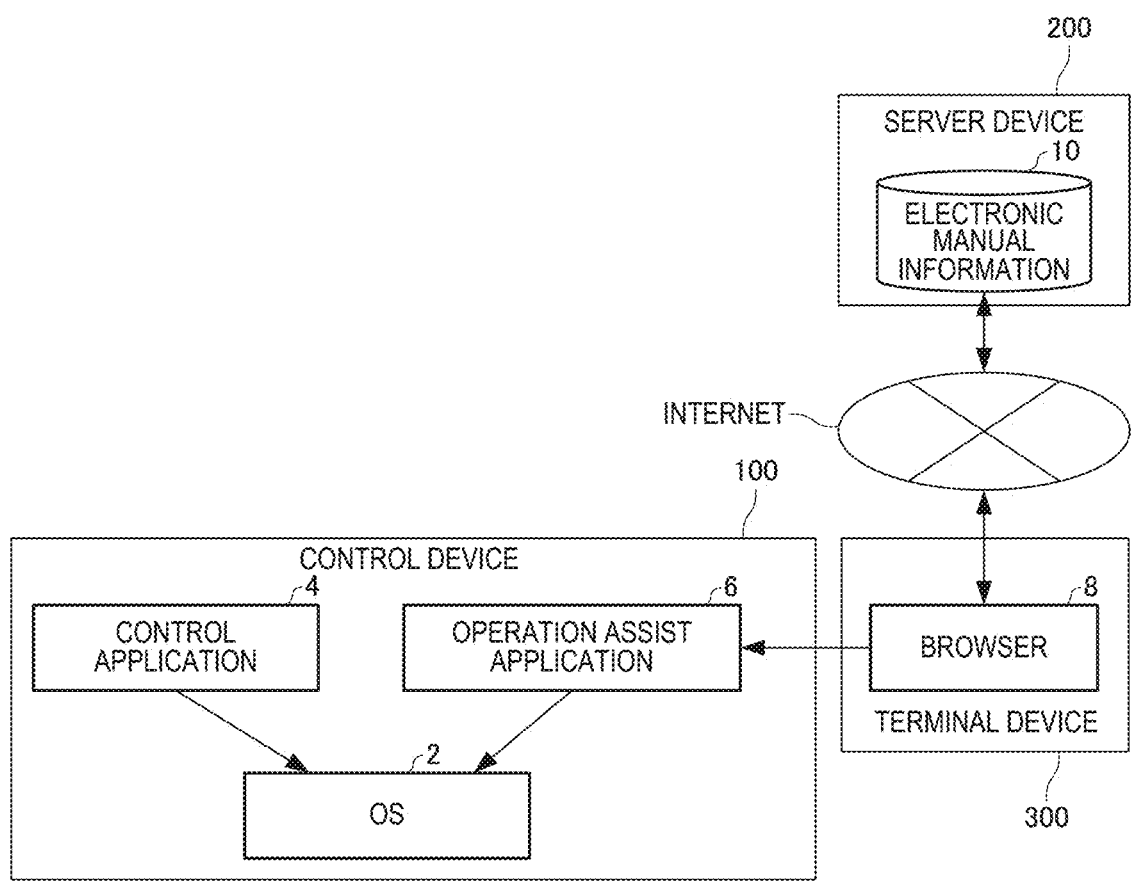
FIG. 10 is a diagram for illustrating still another modification of the control device.

Also, in the embodiments described above, e.g., the operation assist application 6 and the browser 8 operate in the one control device 100. However, as illustrated in FIG. 10, it may also be possible that the operation assist application 6 operates in the control device 100 (PC, i.e., a personal computer) and the browser 8 operates in a terminal device 300.

The terminal device 300 is, e.g., a tablet-type personal computer, a smart phone, or the like. By accessing the server device 200 from the terminal device 300, the user can view the electronic manual via the Internet. The browser 8 outputs various information to the operation assist application 6 using, e.g., the Web API.

Figure 11:
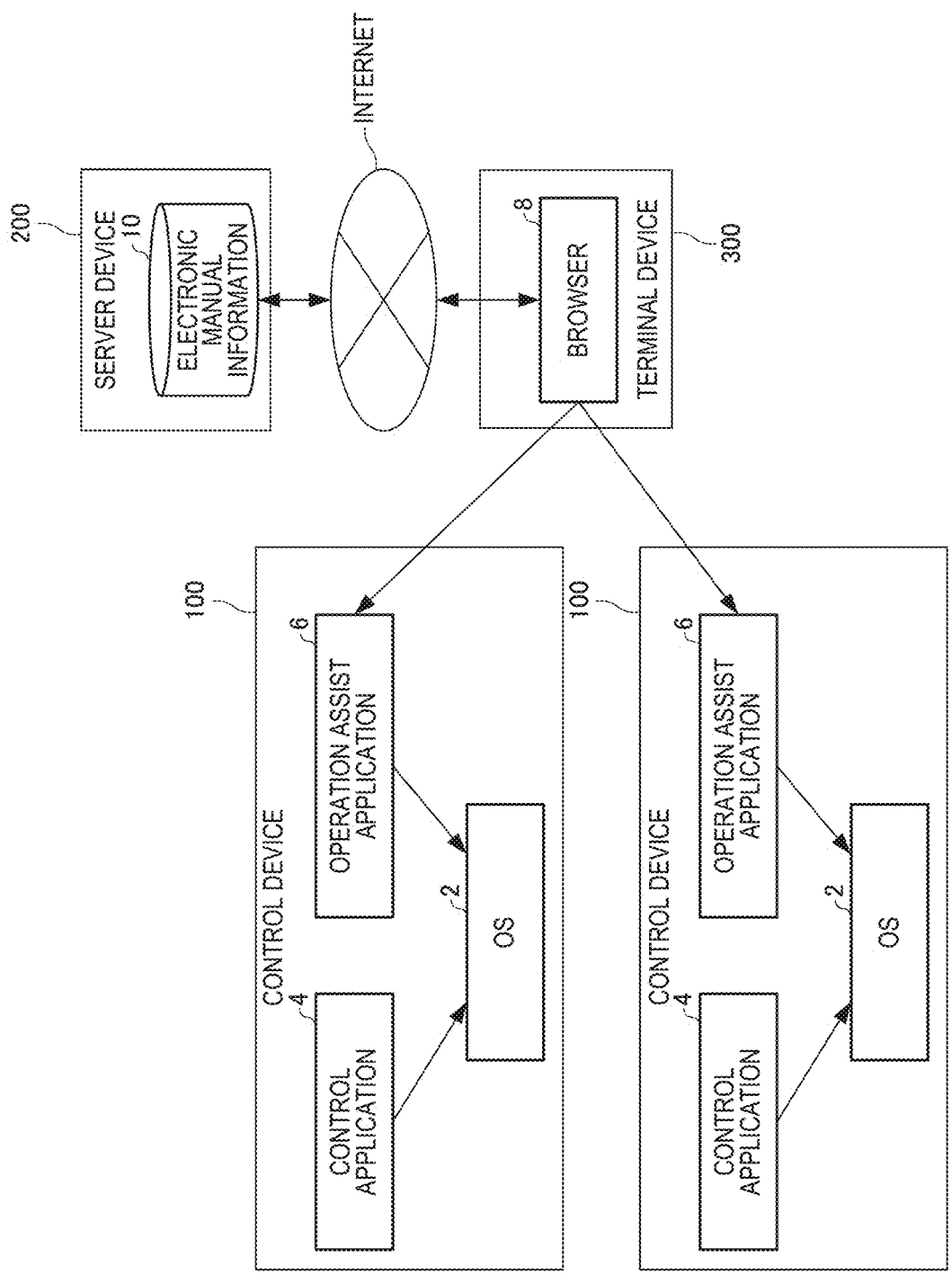
FIG. 11 is a diagram for illustrating yet another modification of the control device.

As also illustrated in FIG. 11, the one terminal device 300 (browser 8) may also output the GUI component designation information to a plurality of (two in the example in the drawing) the control devices 100.

Also, for example, in the embodiments described above, the description has been given of the case where the operation assist application 6 performs operation assist for the one control application 4. However, the operation assist application 6 is not limited to operation assist for a control application which controls an analyzing device or the like. The operation assist application 6 can perform operation assist for all application software products.

Note that the embodiments and the modifications which are described above are only exemplary, and the invention is not limited thereto. For example, each of the embodiments and each of the modifications can appropriately be combined.

The invention includes substantially the same configuration (configuration which is the same in function, method, and result or in object and result) as the configurations described in the embodiments. The invention also includes configurations obtained by replacing the non-essential portions of the configurations described in the embodiments. The invention also includes a configuration which achieves the same function/effect as achieved by the configurations described in the embodiments or a configuration which can attain the same object as attained by the configurations described in the embodiments. The invention also includes configurations obtained by adding a known technique to the configurations described in the embodiments.

Although the embodiments of the invention have thus been described above in detail, those skilled in the art will readily appreciate that many modifications are possible in the embodiments without substantially departing from the new matters and effects of the invention. Accordingly, all such modifications are intended to be included within the scope of the invention.

What is claimed is:

1. A control device controlling an analyzing device or a processing device by using a plurality of separate applications performing control for causing a GUI image including a plurality of GUI components to be displayed on a display screen of a display unit, the plurality of separate applications comprising a control application and an operation assist application separate from the control application, the analyzing device or processing device comprising an electron microscope, a mass spectroscope, an electron probe microanalyzer, and/or a focus ion beam system, the control device comprising:

the display screen of the display unit configured to display, by the control application, an electronic manual for the analyzing device or processing device simultaneously with the GUI components, wherein the GUI components correspond to components of the analyzing device or processing device and each GUI component enables control of at least one corresponding component of the analyzing device or processing device;

a GUI component designation information receiving unit configured to receive, by the operation assist application, GUI component designation information used for designating a GUI component among the GUI components in response to a user selecting a GUI component name displayed on the electronic manual, the GUI component name corresponding to the GUI component;

a position information acquiring unit configured to identify, by the operation assist application, the GUI component designated on the basis of the GUI component designation information and acquire position information indicating a position of the identified GUI component on the display screen from an operation system; and an emphasizing image display control unit configured to superimpose, by the operation assist application, a semi-transparent window over the GUI image in response to the user selecting the GUI component name, wherein by the semi-transparent window a periphery of the identified GUI component is darkened and a portion overlapping the identified GUI component is brightened on the basis of the position information, wherein the emphasizing image display control unit is configured to end superimposition of the semi-transparent window over the GUI image after a predetermined time.

2. The control device according to claim 1, wherein the emphasizing image display control unit performs control for causing the image for emphasizing the identified GUI component to be displayed in a superimposed manner on the GUI image which is caused to be displayed on the display screen by the application.

3. The control device according to claim 1, wherein the plurality of separate applications are applications for controlling the analyzing device or the processing device, and the GUI component designation information receiving unit receives the GUI component designation information output from a browser for viewing the electronic manual for the analyzing device or processing device.

4. The control device according to claim 1, wherein the plurality of separate applications operate on the operation system.

5. The control device according to claim 1, wherein the emphasizing image display control unit is configured to superimpose a transparent window over the GUI image in response to no section of the electronic manual being selected.

6. A non-transitory computer-readable information storage medium storing a program for performing operation assist using a plurality of separate applications performing control for causing a GUI image including a plurality of GUI components to be displayed on a display screen of a display unit, the plurality of separate applications comprising a control application and an operation assist application separate from the control application, the program causing a computer to function as:

a GUI component designation information receiving unit configured to receive, by the operation assist application, GUI component designation information used for designating a GUI component among the GUI components in response to a user selecting a GUI component name displayed on an electronic manual for an analyzing device or processing device, the GUI component name corresponding to the GUI component;

a position information acquiring unit configured to identify, by the operation assist application, the GUI component designated on the basis of the GUI component designation information and acquire position information indicating a position of the identified GUI component on the display screen from an operation system; and an emphasizing image display control unit configured to superimpose, by the operation assist application, a semi-transparent window over the GUI image in response to the user selecting the GUI component name, wherein by the semi-transparent window a periphery of the identified GUI component is darkened and a portion overlapping the identified GUI component is brightened on the basis of the position information, wherein the emphasizing image display control unit is configured to end superimposition of the semi-transparent window over the GUI image after a predetermined time, wherein the display screen of the display unit is configured to display, by the control application, the electronic manual simultaneously with the GUI components, wherein the GUI components correspond to components of the analyzing device or processing device and each GUI component enables control of at least one corresponding component of the analyzing device or processing device, wherein the analyzing device or processing device comprises an electron microscope, a mass spectroscope, an electron probe micro-analyzer, and/or a focus ion beam system.

7. The non-transitory computer-readable information storage medium according to claim 6, wherein the emphasizing image display control unit is configured to superimpose a transparent window over the GUI image in response to no section of the electronic manual being selected.

\* \* \* \* \*